United States Patent [19]

Pailler

[11] Patent Number: 4,619,197

[45] Date of Patent: Oct. 28, 1986

[54] APPARATUS FOR PRINTING AND INSPECTING CARD TICKETS

[75] Inventor: Alain L. N. Pailler, Bourg la Reine, France

[73] Assignee: Electronique Serge Dassault, Paris, France

[21] Appl. No.: 672,184

[22] Filed: Nov. 16, 1984

[30] Foreign Application Priority Data

Jun. 29, 1984 [FR] France ............... 83 10378

[51] Int. Cl.$^4$ ............................................. B41J 3/00
[52] U.S. Cl. ................... 101/93.04; 400/621; 400/625; 400/605; 400/635
[58] Field of Search ............... 101/93.04; 400/621, 400/608.2, 608.3, 608.4, 625, 629, 600.3, 605, 635, 637; 271/109, 225, 9

[56] References Cited

U.S. PATENT DOCUMENTS

| 4,164,376 | 8/1979 | Yarp | 400/605 |
|---|---|---|---|
| 4,216,719 | 8/1980 | Flaceliere et al. | 400/608.2 |
| 4,234,261 | 11/1980 | Hendrischk et al. | 400/608.3 |
| 4,537,125 | 8/1985 | Gaucher | 101/93.04 |

FOREIGN PATENT DOCUMENTS

| 2912656 | 10/1980 | Fed. Rep. of Germany | 400/605 |
|---|---|---|---|
| 174784 | 10/1982 | Japan | 400/625 |
| 82/01515 | 5/1982 | PCT Int'l Appl. | 400/625 |

OTHER PUBLICATIONS

"Printer Paper Feed", IBM Technical Disclosure, vol. 19, No. 10, Mar. 1977, pp. 3632-3633.

*Primary Examiner*—E. H. Eickholt
*Attorney, Agent, or Firm*—Christie, Parker & Hale

[57] ABSTRACT

A card ticket, e.g. for travel, is taken from a stack of blanks (101) which it leaves via two wheels (111, 112) travelling along an axis (113) which does not coincide with the common tangent to two touching wheels (135, 175) which receive the ticket taken from the stack. Thus, once the ticket has completely left the stack unit from which it is taken, it may be reversed partially or totally back out between the receiving wheels (135, 175) without re-engaging the stack unit. The same arrangement can be used at the other end of the internal path to receive a ticket at wheels (163, 203). These wheels can both output a ticket towards a user (arrow F3) and receive a ticket from a user for inspection (arrow F4). Apparatus of this nature can thus create new tickets, inspect unused tickets and return them, and inspect used tickets, cancel them and retain them (arrow F5).

8 Claims, 1 Drawing Figure

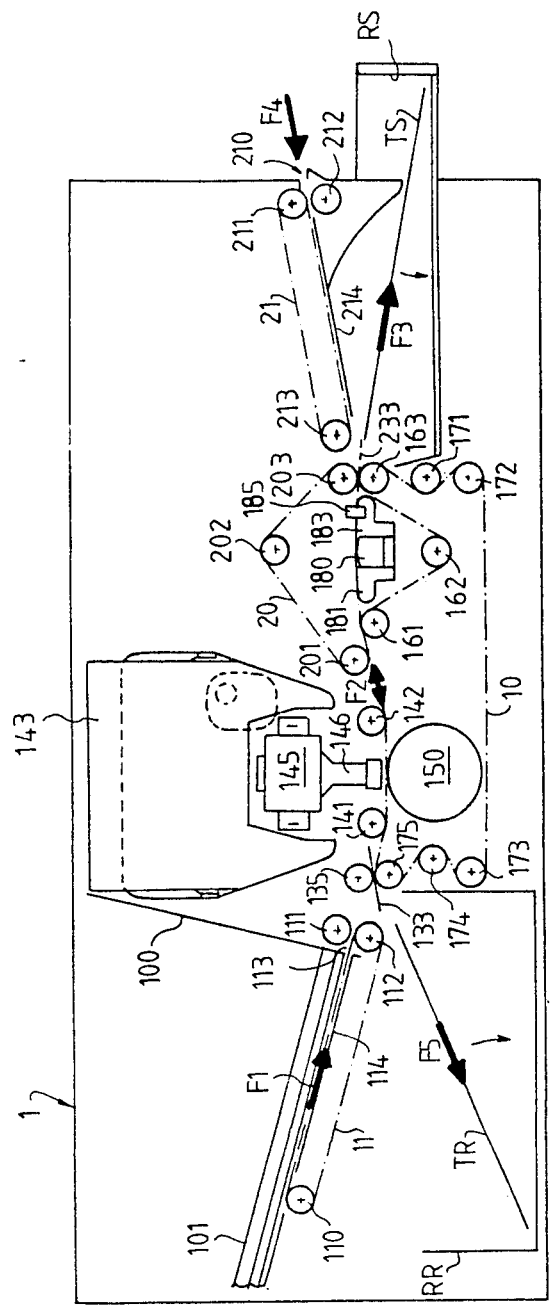

APPARATUS FOR PRINTING AND INSPECTING CARD TICKETS

The invention relates to processing card tickets such as are used for travel or the like.

BACKGROUND OF THE INVENTION

Many modern travel tickets are made from a paper medium which is more or less reinforced in order to have sufficient rigidity. The term "card" is used herein to designate such a medium which generally includes a magnetic track. In some cases the ticket may also have lines of weakness to enable one or more coupons to be separated therefrom, eg, during ticket inspection.

In general, the processing of such tickets begins with a valid ticket being created on a blank ticket medium, continues with the ticket being inspected one or more times, and ends, where applicable, with the ticket being cancelled after use.

Preferred embodiments of the present invention provide apparatus which is suitable both for creating tickets and for inspecting and/or cancelling tickets, such preferred apparatus is mechanically simple, is reliable even when damaged tickets are presented to it, and is reasonably priced for the applications of this type of apparatus.

SUMMARY OF THE INVENTION

The present invention provides apparatus for processing card tickets including means for driving a ticket along an internal path of the apparatus, which path passes through at least one processing station, such as a station for printing on the ticket, with at least one of the ends of the internal path being defined by a pair of wheels which are substantially tangential to each other, the apparatus further including a guide and feed unit, outside the internal path, for bringing a ticket to said internal path.

According to the invention, the improvement is that the common tangent of the said pair of wheels is inclined relative to the guide axis of the said guide and feed unit and points below the said axis, with the said axis being substantially tangential to the upper wheel of the said pair, thus enabling a ticket to be reversed without the ticket returning to the said guide and feed unit, and without any need for switch means to deflect a reversing ticket away from the guide and feed unit.

The other end of the internal path may co-operate in like manner with a second guide and feed unit.

A ticket receptacle may be placed beneath at least one of the guide and feed units.

In a first embodiment, the guide and feed unit includes a magazine containing a pile of pre-cut tickets.

In a second embodiment, the guide and feed unit includes means for unreeling a continuous tape of card medium together with means for cutting the tape.

In a third embodiment, the guide and feed unit is suitable for receiving a ticket that has already been issued.

In a particular embodiment of the invention, the means for driving the ticket over the internal path include at least one notched belt which follows a closed loop over wheels; the portion of the belt concerned with the internal path of the ticket being pressed against wheels around which it curves with the ticket passing between the belt and the wheels, and in principle with adjacent pairs of wheels being separated by less than the length of a ticket.

Preferably, the belt curves around each wheel through an angle in the range 160° to 170°. In addition, the notched belt may be driven by a stepper motor and also be kept under tension by a tension wheel situated off the internal path.

In a variant embodiment, the card ticket has a magnetic track, the notched belt which follows the ticket from its arrival at the internal path to its departure therefrom is guided away from the internal path round a station including a magnetic head and situated at a second point on the internal path where the ticket is urged aginst the magnetic head by a second belt co-operating with the first by friction. In this case, the belts are preferably situated substantially in register with the magnetic track.

More particularly, the first belt may have notches at a pitch of less than 5 mm, and preferably close to 2 mm; while the processing station includes a dot-matrix printer placed opposite a roller which acts as a printing platen.

BRIEF DESCRIPTION OF THE DRAWING

An embodiment of the invention is described by way of example with reference to the sole FIGURE of the accompanying drawing which is a diagrammatic side view of ticket processing apparatus in accordance with the invention.

MORE DETAILED DESCRIPTION

In the FIGURE, reference 1 generally designates the frame of the apparatus.

Reference 100 designates a magazine containing a pile 101 of pre-cut tickets (the pile is shown practically empty). Means (not shown) are provided at the bottom of the magazine to isolate the bottom ticket of the pile to enable the ticket to be removed therefrom. Once it has been isolated, the bottom ticket bears against a plate 114 over which there runs a belt 11 which passes over end wheels 110 and 112. Opposite the end wheel 112 there is another wheel 111 for facilitating ticket removal. Reference 113 designates the guide axis along which a ticket passes as it is fed from the magazine 100.

Such a ticket then enters the "internal path" of the ticket processing apparatus.

One of the ends of this internal path is defined by a first end pair of wheels 135, 175. The other end of the internal path is defined by a second end pair of wheels 163 and 203.

A belt, which is preferably notched, winds round wheels 173 and 174 before passing round the wheel 175. The belt 10 then meets a printing station defined by a dot-matrix printer represented in the FIGURE by a base 145 and a print needle guide 146. An ink ribbon cartridge 143 is fixed to the printer. The ticket passes from one side of the print station to the other between wheels 141 and 142 and the belt 10. Thereafter the belt 10 is deflected away from the internal path by a wheel 161 to a wheel 162 and then returns to the internal path at the wheel 163 which constitutes the end of the internal path. After the wheel 163, the belt 10 passes over further wheels 171, 172 before returning to the above-mentioned wheel 173. The purpose of the detour around the wheels 161 to 163 is to enable a magnetic head 180 mounted on a plate 181, 183 to be inserted on the internal path. The magnetic head is advantageously associated with a ticket detector 185. Opposite the head 180 and the plate 181, 183, there is a second belt 20 running round two wheels 201 and 203 on the internal path as well as round a return wheel 202 off the path. Means (not shown) keep the belts 10 and 20 under tension, and drive the belt 10, consequently also driving the belt 20.

Additional details on the internal path may be obtained from U.S. Pat. No. 4,537,125 and is to be considered as being incorporated in the present patent application.

A roller 150 is provided opposite to the print head 145, 146 to act as a platen. Preferably, the belt 10 is received in a notch in the surface of the roller so as to present a smooth surface in continuity with the outer generator line of the roller as described in the above-mentioned prior patent application.

However, it is clear that the present invention is also applicable to other modes of implementing the internal path, which do not require the use of one or more belts.

On examination of the left hand end of the internal path as shown in the accompanying FIGURE, it can be seen that the pair of wheels 135, 175 defines an inlet axis 133 for a ticket. This axis is normally defined by the tangent common to the two wheels 135, 173. It can immediately be seen that the axis 133 is inclined with respect to the axis 113 along which the guide and feed unit 100 brings a ticket to the internal path, and passes underneath this unit.

The Applicant has observed that, surprisingly, it is perfectly possible to correctly insert a ticket into the internal path via the inlet defined by the wheels 135 and 175, even though the axes 133 and 113 are not substantially in line with each other. The ticket is properly inserted so long as the axis 113 along which the ticket arrives is substantially tangential to the upper wheel 135, or preferably intersects the wheel slightly along a secant. In this respect, the drawing shows a suitable configuration of the respective positions of the wheels 111 and 112 on one side, and 135 and 175 on the other.

This configuration may be used not only at the blank ticket inlet end of the internal path shown at the left hand side of the FIGURE, as defined by the wheels 135 and 175, but it may also be used at the existing ticket inlet end defined by the wheels 163 and 203 at the right hand side of the FIGURE. On the far right of the FIGURE, there is an inlet slot 210 for admitting a ticket between two wheels 211 and 212. Immediately downstream from the slot 210, the ticket is supported on a plate 214. A belt 21 passes round the wheel 211 as well as over another wheel 213. This belt is suitably driven to enable a ticket to be inserted, and to deliver it to the right hand inlet end of the internal path.

Here again it can be seen that the common tangent of the wheels 163 and 203 is inclined to pass beneath the ticket insertion axis coming in from the right, which axis corresponds substantially to the lower rectilinear portion of the belt 21. As before, a ticket inserted in this way from the right is tangential to the wheel 203 (or else meets it along a line which intersects the wheel slightly along a short secant), and is readily inserted between the wheels 203 and 163, provided, of course, that the direction of rotation of the belts 10 and 20 is reversed relative to their direction of rotation for ticket insertion from the left.

Under the left hand guide and feed unit 100, there is a reject receptacle RR into which rejected tickets such as TR may be inserted. Likewise, under the right hand guide and feed unit, there is a dispensing or outlet receptacle RS which is accessible from outside and into which tickets TS may be delivered for dispensing to users.

In a variant of the invention, the ticket magazine 100 is replaced by means for unreeling a continuous tape of ticket material having the same width as a ticket and suitable for being cut up into ticket-sized lengths by a knife. One manner of doing this is described in the above-mentioned patent application.

It can now be seen that apparatus in accordance with the invention provides a very flexible means for processing card tickets, ie. it is capable of performing substantially all of the operations that people would like such machines to perform.

When a ticket is to be created, a pre-cut ticket blank is taken from the stack 101 (or a suitable length of blank ticket tape is cut from a reel), and the blank ticket is delivered to the internal path in the direction of arrow F1. The ticket blank thus begins by moving to right in the FIGURE. The blank is then printed in some suitable manner by the print head 145 which is mounted to move across the ticket perpendicularly to the plane of the FIGURE. If the ticket includes a magnetic track, suitable magnetic recordings are made thereon by the magnetic head 180. If a magnetic track is not used, then the corresponding portions of the internal path and the entire belt 20 may be omitted, leaving the belt 10 substantially rectilinear on the internal path. The newly created ticket then leaves the internal path and is dispensed along arrow F3 into the receptacle RS from which the user may remove it. If a test (performed by means not shown) reveals that the ticket has been improperly created, the ticket may be rejected into the reject receptacle RR simply by reversing the direction of movement of the belt 10. The ticket naturally follows arrow F5 into the reject receptacle under these circumstances without the need for mechanical or any other sort of switching to deflect the ticket to prevent it from going back up the arrow F1 into the stack 101. Another advantage is that if printing is performed along the ticket, and the ticket is long relative to the internal path, the ticket may be moved backwards and forwards past the print head as many times as may be desirable to complete printing, each time passing underneath the guide and feed unit 100 and its wheel 112, rather than attempting to return back up its initial arrival axis. There is no need for any kind of switching to deflect the ticket.

Once a ticket has been created in this manner by such apparatus (which apparatus may also collect money from the user prior to dispensing the ticket), the same apparatus or identical apparatus located elsewhere may also be used to inspect the ticket. In this case, the user inserts the ticket via the slot 210 along arrow F4. The ticket is received into the internal path where it is read magnetically by the magnetic head 180, and where it may optionally be partially overprinted by the print head 145. After inspection, the ticket is normally returned to the user along arrow F3 and via the outlet receptacle RS. A suitable message is displayed to inform the user whether the ticket has been recognized as valid. In the event of a manifest attempted fraud, the ticket may alternatively be retained in the reject receptacle RR.

In some situations, it is necessary to inspect tickets after use. This applies, for example, to some transport systems. The procedure is the same: the user inserts the ticket into the slot 210 as indicated by arrow F4 and the ticket is inspected as described above. The ticket may be returned, eg. an unexpired period ticket, or it may be retained in the reject receptacle, eg. a one way ticket at the end of the journey.

The ticket is rejected simply by reversing the movement of the belt. Additionally, since the print head lies naturally on the path to the reject receptacle, it is very easy to cancel a reject ticket in some manner that is visible to the human eye, thereby making a reject ticket totally unuseable. This improves overall system security.

In the preferred embodiment described above, the internal path is defined by a belt. It should be observed that this belt (which is preferably notched) curves around and presses against wheels 141, 142, 201 and 161 and that a ticket, when present, passes between the belt and these wheels. Further, the maximum distance between any successive pair of such wheels is less than the length of the shortest expected ticket. It has been found that this constitutes an excellent means for guiding a card ticket through a print station. Adjacent to this, in the portion of the internal path where two belts are used, as is the case for the magnetic station, the ticket is guided between the two belts or else between one of the belts, eg. the belt 20, and a plate defined by the portions 181 and 183 on either side of the magnetic head 180.

Naturally the present invention is not limited to the embodiments described, but extends to any variant thereof within the scope of the accompanying claims. Furthermore, the invention may be combined, for example, with the inventions described and claimed in the Applicants' copending French patent applications: No. 84 10379 for "Device for printing flight plan marker strips for air navigation"; and No. 84 10380 for "Cylindrical platen printer device, in particular for travel tickets".

I claim:

1. Apparatus for processing card tickets, the apparatus being of the type including means for reversibly driving a ticket along an internal path of the apparatus which path passes through at least one processing station, with at least one of the ends of the internal path being defined by a pair of wheels which are substantially tangential to each other, the apparatus further including a first guide and feed unit, outside the internal path, for bringing a ticket to said internal path, the improvement wherein the common tangent of the said pair of wheels is inclined relative to the guide axis of the said guide and feed unit and passes underneath the said unit, with the said axis being substantially tangential to the upper wheel of the said pair, thereby enabling a ticket to be reversed without the ticket returning to the said guide and feed unit, and without any need for switching means to deflect a reversing ticket away from the guide and feed unit, the apparatus further including a second guide and feed unit located at the other end of the internal path and cooperating therewith in the same manner as the first guide the feed unit.

2. In an apparatus for processing card tickets having means for driving a ticket forwardly and reversely along and internal path one end of which defines a feed end, a processing station to impart indicia to said ticket along the internal path and means for loading a ticket along a separate guide path on to the internal path, the improvement comprising:

a pair of wheels disposed at said feed end, said wheels cooperating to define a nip to trap and transfer said ticket from the guide path to the internal path for processing when said drive means are driven forwardly, said wheels arranged at the nip to have a common tangent making an angle relative to said guide path, said guide wheels when the driving means are driven reversely, trapping and transferring the ticket from the internal path in the direction of said common tangent away from said guide path.

3. The apparatus of claim 2 wherein said guide wheels are arranged such that the common tangent at the nip extends in a direction below said guide path, reverse drive of said guide wheels trapping and transferring the ticket from the internal path in said direction.

4. Apparatus according to claim 2, wherein the loading means includes a magazine containing a pile of precut tickets.

5. Apparatus according to claim 3, including a ticket receptacle disposed under the loading means to capture said ticket.

6. Apparatus according to claim 2, wherein the loading means is suitable for receiving a ticket that has already been issued.

7. Apparatus according to claim 2, wherein the means for driving the ticket over the internal path include at least one notched belt which follows a closed loop over wheels, the portion of the belt concerned with the internal path of the ticket being pressed against wheels around which it curves with the ticket passing between the belt and the wheels, and wherein successive wheels are separated by intervals shorter than the length of a ticket.

8. Apparatus according to claim 7, wherein the notched belt is driven by a stepper motor.

* * * * *

UNITED STATES PATENT AND TRADEMARK OFFICE
CERTIFICATE OF CORRECTION

PATENT NO. : 4,619,197

DATED : October 28, 1986

INVENTOR(S) : Alain L.N. Pailler

It is certified that error appears in the above-identified patent and that said Letters Patent is hereby corrected as shown below:

Column 1, line 15, change "eg," to -- e.g., --.
Column 4, line 19, after "to" insert -- the --.
Column 5, lines 2,3,25, change "eg." to -- e.g. --.
Column 5, line 10, change "unuseable" to -- unusable --.
Column 5, line 32, change "copending" to -- co-pending --.
Column 5, lines 33-36, change "Device for printing flight plan marker strips for air navigation" to -- "Device for Printing Flight Plan Marker Strips for Air Navigation" --; change "Cylindrical platen printer device, in particular for travel tickets" to -- "Cylindrical Platen Printer Device, in Particular for Travel Tickets" --.
Column 6, line 7, after "guide" insert -- and --.
Column 6, line 10, change "and" to -- an --.

Signed and Sealed this

Ninth Day of February, 1988

*Attest:*

DONALD J. QUIGG

*Attesting Officer*    *Commissioner of Patents and Trademarks*